Oct. 8, 1935.  T. H. IRELAND  2,016,746
FLUID HEATER
Filed Aug. 25, 1933
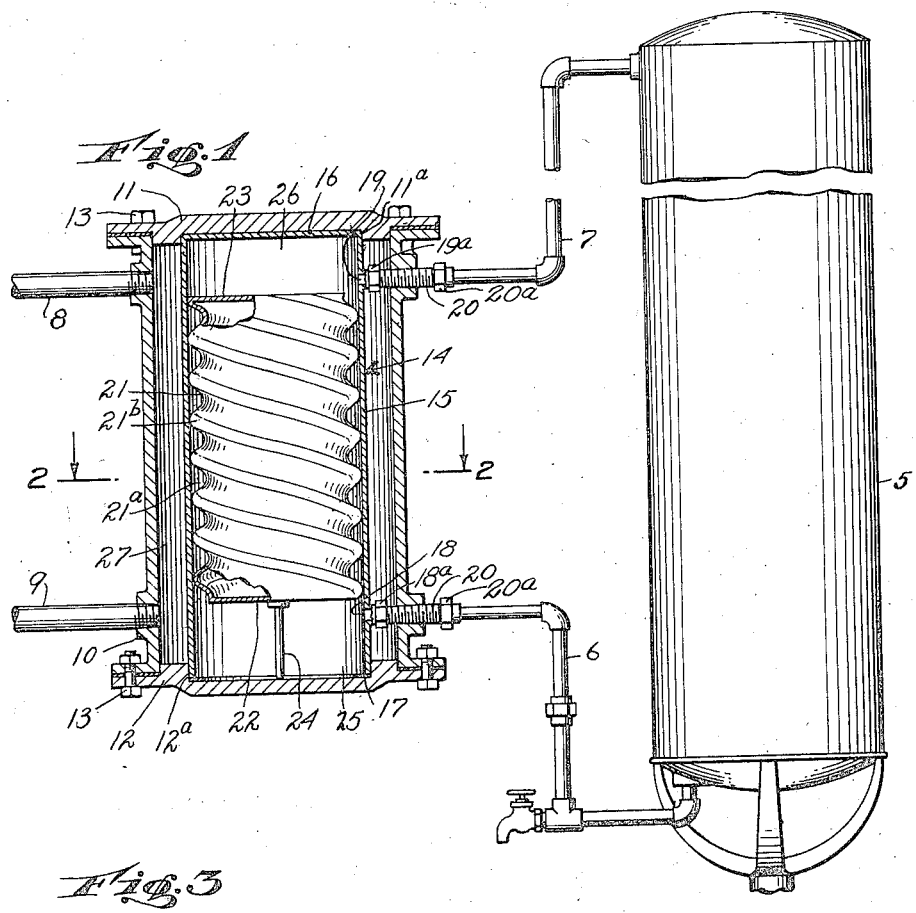
INVENTOR.
THOMAS H. IRELAND
BY
ATTORNEY.

Patented Oct. 8, 1935

2,016,746

UNITED STATES PATENT OFFICE 2,016,746

FLUID HEATER

Thomas H. Ireland, Rockville Centre, N. Y.

Application August 25, 1933, Serial No. 686,702

12 Claims. (Cl. 257—232)

This invention relates to heaters for heating water and other fluids; and the object of the invention is to provide a device of the class described including a casing with a fluid circulating unit therein, and means in the casing for heating said unit so as to heat the fluid circulated therethrough; a further object being to provide a circulating unit of the class described in the form of a spiral grooved body providing thereon one or more continuous spiral passages through which a fluid to be heated is circulated so as to provide efficient heating of the fluid passed therethrough within a minimum space; a further object being to provide means for detachably coupling the grooved body with the casing so as to facilitate the cleaning thereof to remove scale, sediment or other foreign matter that may collect thereon; a further object being to so mount the grooved body of the circulating unit as to provide below said body a sediment chamber which may be cleaned from time to time by removing a closure plate or cap on said casing, thus insuring long life and efficient service to the heater; a still further object being to provide means for bringing a heating medium in contact with the inner and outer surfaces of the circulating unit or the spiral grooved body thereof; and with these and other objects in view, the invention consists in a fluid heater of the class and for the purpose specified, which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a diagrammatic view indicating one use of my invention and showing the heater in section.

Fig. 2 is a partial section on the line 2—2 of Fig. 1; and,

Fig. 3 is a vertical, sectional view of a modification of the heater shown in Fig. 1.

For the purpose of illustrating one use of my invention or method of carrying it into effect, I have indicated in Fig. 1 of the drawing, a heater as applied to what is commonly termed an indirect water heater system. In said figure, 5 represents a hot water storage tank, to the lower end of which is coupled the pipe 6 and to the upper end of which is coupled a pipe 7. At 8 and 9, I have shown pipes coming from a range, furnace, boiler or other source of hot water supply which are coupled with the casing 10 of my improved heater adjacent the ends thereof, as clearly seen.

In the construction shown, the casing 10 is in the form of a tube open at both ends, said ends being closed by caps or covers 11 and 12 coupled with flanges on the ends of the casing 10 by bolts, screws or other devices 13. The inner surfaces of the covers 11 and 12 are provided with recesses 11a, 12a, in which is seated a circulating unit 14. This unit consists of a cylindrical or tubular member 15 open at the end seating in the recess 12a and closed at its opposite end as seen at 16. The open end of the member 15 seats on a gasket 17, and in this connection, it will be apparent that the closed end 16 may be left open to seat on a similar gasket within the recess 11a. The member 15 has an inlet port 18 and an outlet port 19 adjacent the ends thereof, with which the pipes 6 and 7 respectively communicate through a fitting consisting of nipples 20 in threaded engagement with the casing 10 and extending into the chamber thereof and coupled with unions 18a and 19a secured to the member 15 adjacent and in communication with the ports 18 and 19 respectively, so that the member 15 may be readily detached and removed from the casing as will be apparent. Other unions 20a are employed for coupling the pipes 6 and 7 with the nipples 20.

Arranged in the member 15 intermediate the ports 18 and 19 is a spirally grooved body 21, which in the construction shown, is hollow or tubular in form and provided with closed end walls 22 and 23, the wall 22 including a downwardly extending pin 24 which serves to space the bottom of the body 21 with respect to the cover 12 to provide below the wall 22 a sediment chamber 25, whereas, a discharge chamber 26 is formed within the member 15 above the wall 23. The grooves 21a formed in the outer surface of the body 21 may be one continuous groove or a number of spiral grooves so as to form one or more spiral fluid passages, through which fluid entering the chamber 25 may be circulated adjacent the inner surface of the member 15 and discharged into the chamber 26 and introduced into the tank 5 through the pipe 7, it being understood that the hot water circulated through the chamber 27 formed between the member 15 and the wall of the casing 10 will transmit its heat to said member and to the fluid circulated through the spiral fluid passages.

With the construction shown, it will be understood that the body 21 frictionally engages the member 15 so that the ribs 21b of said body will engage the wall of the member to form said spiral passages. When it is desired to clean the device, all that is necessary is to remove the cover 12 and then draw the body 21 outwardly through the open end of the member 15, removing the sediment that may collect in the chamber 25 and also facilitating thorough cleaning of the body 21 and the grooves thereof to facilitate proper circulation of the fluid therethrough, at the same time facilitating the cleaning of the bore of the tube 15. These results can be accomplished without disturbing any of the pipes 6, 7, 8, and 9. However, should it be found desirable to remove the member 15, the pipes 6 and 7 may be detached therefrom and said member drawn through the end of the casing from which the cover has been removed.

In Fig. 3 of the drawing, I have shown a slight modification in the form of the heater, and in this figure, the pipes 6a, 7a, and 8a and 9a are equivalent to the pipes 6, 7, 8, and 9 shown in Fig. 1 of the drawing. In this construction, the heater consists of a casing 28, generally speaking, similar to the casing 10 and having caps or covers 29 and 30 detachably secured to the flanged ends of said casing by bolts, screws or other devices 31. In this construction, the covers 29 and 30 are both formed with chambers 29a and 30a therein which open into the annular chamber 32 of the casing formed outwardly of the circulating unit 33 through circumferential ports 29b and 30b.

The inner surfaces of the covers 29 and 30 are provided with annular channels 29c and 30c in which are seated the ends of inner and outer cylindrical or tubular members 34 and 35 of the unit 33, the ends of said tubes seating on suitable packing gaskets 36 disposed in said channels. Between the tubular members 34 and 35 is a fluid circulating chamber 37, and in this chamber is disposed a spirally grooved tube 38 forming with the members 34 and 35 inner and outer spiral passages 39 and 40 respectively, through which a fluid introduced into the lower end of the chamber 37 flows and is discharged into the upper end of said chamber and out through the pipe 7a. The member 35 has an inlet port 41 disposed below the tube 38 and an outlet port 42 disposed above said tube 38 to provide for the said spiral circulation of the fluid through the unit 33, the member 35 having unions 41a and 42a connecting with nipples 41b and 42b similar to the nipples 20, and unions 41c and 42c for coupling the pipes 6a and 7a with said nipples.

With this construction, it will be apparent that the heating fluid or water circulated through the heater by means of the pipes 8a, 9a, will pass through the chamber 32 and also through the bore 43 of the member 34. The bore 43 is placed in communication with the chamber 32 through the chambers 29a, 30a and ports 29b and 30b. It will thus be seen that as the inner and outer spiral columns of fluid are circulated through the unit 33 by virtue of the passages 39 and 40, the same will be heated by the heating medium in contact with the members 34 and 35, as will be apparent.

With this construction, the lower end of the chamber 37 will form a sediment chamber which may be cleaned out by removing the cap or cover 30. It will also be understood that the inner member 34 and the spirally grooved tube 38 may be removed to clean the parts of the circulating unit, and if desired, the pipes 6a, 7a, may be detached from the member 35 and said member also removed to clean out the chamber 32. How- ever, the latter is not likely to be found necessary, in that the removal of the cover 30 exposes the chamber 32 for cleaning by a suitable brush or other cleaning element.

While I have indicated one use of my invention and have referred to the device as a heater or heat exchanger, it will be apparent that the device is adaptable to many uses wherein the circulation of fluids, gases or the like is desired for various purposes and in dealing with the device as a heater, and it will also be apparent that I may heat fluids or gases of various kinds and classes. Still further, my invention is not necessarily limited to the particular type and arrangement of heater herein referred to, as the circulating unit of the heater may be heated by any suitable or desirable source of heat supply. It will also be understood that the casing or housing of the device will be constructed to suit the different types of heating mediums employed.

The outstanding features of my invention reside in the particular type of circulating unit employed and in the formation of spiral or coil-like passages through which a fluid to be heated is circulated. The unit is so constructed as to facilitate the thorough cleaning thereof from time to time, especially in dealing with fluids of certain kinds and classes and of characteristics which will cause clogging or congestion of the circulating system from time to time. Still further a circulating unit is provided wherein the parts may be readily detached for cleaning and other purposes.

It will also be understood that my invention is not necessarily limited to the specific structure of the bodies or members 21, 38, herein disclosed, and various other changes in and modifications of the construction herein set out may be made within the scope of the appended claims without departing from the spirit of my invention or sacrificing its advantages.

Having fully described my invention, what I claim as new and desire to secure by Letters Patent, is:

1. A device of the class described comprising a tubular casing open at one end, a cover for said open end, a fluid circulating unit insertable into and removable from the casing through the open end thereof, said unit comprising a cylindrical member engaging said cover to form within the casing a chamber surrounding said member into and through which a heating medium may be circulated, means including pipes coupled with the casing independent of said cover for circulating the heating medium through said chamber whereby said unit is insertable into and removable from the casing without disturbing the coupling of said pipes with the casing.

2. A device of the class described comprising a tubular casing open at one end, a cover for said open end, a fluid circulating unit insertable into and removable from the casing through the open end thereof, said unit comprising a cylindrical member engaging said cover to form within the casing a chamber surrounding said member into and through which a heating medium may be circulated, means including pipes coupled with the casing independent of said cover for circulating the heating medium through said chamber whereby said unit is insertable into and removable from the casing without disturbing the coupling of said pipes with the casing, and means within the member of said unit intermediate the ends thereof for forming a spiral fluid passage within said member adjacent the wall thereof exposed to said chamber.

3. A device of the class described comprising a tubular casing open at one end, a cover for said open end, a fluid circulating unit insertable into and removable from the casing through the open end thereof, said unit comprising a cylindrical member engaging said cover to form within the casing a chamber surrounding said member into and through which a heating medium may be circulated, means including pipes coupled with the casing independent of said cover for circulating the heating medium through said chamber whereby said unit is insertable into and removable from the casing without disturbing the coupling of said pipes with the casing, means within the member of said unit intermediate the ends thereof for forming a spiral fluid passage within said member adjacent the wall thereof exposed to said chamber, and means involving circulating pipes detachably coupled with said member within the casing adjacent the side walls thereof for circulating a fluid to be heated through member and the spiral passage formed therein.

4. A heat exchanger of the class described comprising a casing open at one end, a cover for closing the open end of the casing, a fluid circulating unit mounted in the casing through the open end thereof, said unit comprising a tubular body arranged longitudinally of the casing and forming between the outer wall thereof and the inner wall of the casing an elongated chamber, means coupled with the casing independent of said cover for circulating a heating medium through said chamber, means in said unit forming a spiral passage extending longitudinally thereof, said means being disposed intermediate the ends of said unit to divide said unit into intake and discharge chambers at opposed ends thereof, intake and discharge pipes extending through the side wall of the casing and detachably coupled with said unit to communicate with said intake and discharge chambers whereby a fluid to be heated may be circulated through said unit, the means forming said spiral passage comprising a sheet metal tube grooved circumferentially to form said passage on the outer surface thereof, said unit also comprising means disposed within said grooved tube for forming an inner spiral passage communicating with said intake and discharge chambers.

5. In a heat exchanger of the class described, a circulating unit comprising an elongated tubular body, a sheet metal member fashioned to form spiral grooves extending longitudinally of said member, said member fitting snugly in said body to form in conjunction with the wall of said body spiral circulating passages opening through both ends of said member.

6. In a heat exchanger of the class described, a circulating unit comprising an elongated tubular body, a sheet metal member fashioned to form spiral grooves extending longitudinally of said member, said member fitting snugly in said body to form in conjunction with the wall of said body spiral circulating passages opening through both ends of said member, and said member being disposed intermediate the ends of said body to form intake and discharge chambers at opposite ends of the member within said body whereby a fluid or gas in the inlet chamber may be circulated through said spiral passages into the discharge chamber.

7. In a heat exchanger of the class described, a circulating unit comprising an elongated tubular body, a sheet metal member fashioned to form spiral grooves extending longitudinally of said member, said member fitting snugly in said body to form in conjunction with the wall of said body spiral circulating passages opening through both ends of said member, said member being disposed intermediate the ends of said body to form intake and discharge chambers at opposite ends of the member within said body whereby a fluid or gas in the inlet chamber may be circulated through said spiral passages into the discharge chamber, and means on said body adjacent the intake and discharge chambers for detachably coupling intake and discharge pipes therewith.

8. In a heat exchanger of the class described, a casing, a circulating unit in said casing, said unit comprising inner and outer elongated tubes spaced apart and closed at their ends to form a passage therebetween, a sheet metal member fashioned to form spiral grooves extending longitudinally thereof, said member being arranged in said passage and fitting snugly between said tubes to form in conjunction with the walls thereof inner and outer spiral circulating passages, said member being disposed intermediate the ends of said tubes to form intake and discharge chambers at opposite ends of said member between said tubes and the closed ends thereof, means on said unit adjacent the said intake and discharge chambers for detachably coupling intake and discharge pipes therewith whereby a fluid introduced into the intake chamber may be circulated through the inner and outer spiral passages into the discharge chamber in the operation of said unit.

9. A circulating unit of the class described comprising inner and outer tubular members with an annular circulating passage formed therebetween and means disposed within said passages intermediate the ends of said members for dividing the passage into intake and discharge chambers and inner and outer spiral passages communicating with said intake and discharge chambers.

10. A circulating unit of the class described comprising inner and outer tubular members with an annular circulating passage formed therebetween, means disposed within said passage intermediate the ends of said members for dividing the passage into intake and discharge chambers and inner and outer spiral passages communicating with said intake and discharge chambers, and means for detachably coupling intake and discharge pipes with one of said first named members to communicate with the intake and discharge chambers respectively.

11. In a heat exchanger of the class described, a casing, a circulating unit in said casing, said unit comprising inner and outer elongated tubes spaced apart and closed at their ends to form a passage therebetween, a sheet metal member fashioned to form spiral grooves extending longitudinally thereof, said member being arranged in said passage and fitting snugly between said tubes to form in conjunction with the walls thereof, inner and outer spiral circulating passages, said member being disposed intermediate the ends of said tubes to form intake and discharge chambers at opposite ends of said member between tubes and the closed ends thereof, means on said unit adjacent the said intake and discharge chambers for detachably coupling intake and discharge pipes therewith whereby a fluid introduced into the intake chamber may be circulated through the inner and outer spiral passages into the discharge chamber in the operation of said unit, said casing being open at one end to permit attachment and detachment of said unit therewith, and a cover closing the open end of said casing.

12. In a heat exchanger of the class described, a casing, a circulating unit in said casing, said unit comprising inner and outer elongated tubes spaced apart and closed at their ends to form a passage therebetween, a sheet metal member fashioned to form spiral grooves extending longitudinally thereof, said member being arranged in said passage and fitting snugly between said tubes to form in conjunction with the walls thereof, inner and outer spiral circulating passages, said member being disposed intermediate the ends of said tubes to form intake and discharge chambers at opposite ends of said member between said tubes and the closed ends thereof, means on said unit adjacent the said intake and discharge chambers for detachably coupling intake and discharge pipes therewith whereby a fluid introduced into the intake chamber may be circulated through the inner and outer spiral passages into the discharge chamber in the operation of said unit, said casing being open at one end to permit attachment and detachment of said unit therewith and a cover closing the open end of said casing, and the mounting of said unit within the casing being such as to form circulating passages outwardly of and longitudinally of said outer tube and inwardly of and through said inner tube.

THOMAS H. IRELAND.